United States Patent [19]

Prodel et al.

[11] Patent Number: 4,787,496
[45] Date of Patent: Nov. 29, 1988

[54] APPARATUS FOR THE ASSEMBLY AND/OR MACHINING OF CIRCULATING AND IMMOBILIZABLE PARTS CARRIED BY PALLETS

[76] Inventors: Maurice Prodel, 153, rue de Verdun-Carlepont; Jacques Prodel, Rue de Cuts - Carlepont, both of 60170 Ribecourt, France

[21] Appl. No.: 81,535

[22] Filed: Aug. 4, 1987

Related U.S. Application Data

[63] Continuation of Ser. No. 673,009, Nov. 19, 1984, abandoned, which is a continuation of Ser. No. 311,117, Oct. 14, 1981, Pat. No. 4,519,491.

[30] Foreign Application Priority Data

| Oct. 14, 1980 | [FR] | France | 80 21976 |
| Apr. 8, 1981 | [FR] | France | 81 07088 |
| Sep. 11, 1981 | [FR] | France | 81 17272 |
| Oct. 9, 1981 | [FR] | France | 81 19109 |

[51] Int. Cl.$^4$ .................................... B65G 37/00
[52] U.S. Cl. ....................... 198/346.1; 198/465.2; 198/583
[58] Field of Search ............... 198/346.1, 349, 465.1, 198/465.2, 583, 584, 860.2; 29/33 P, 563

[56] References Cited

U.S. PATENT DOCUMENTS

| 2,837,223 | 6/1958 | Wolff | 414/237 |
| 3,109,533 | 11/1963 | Blose | 198/793 |
| 3,221,754 | 12/1965 | Robson et al. | 198/472 X |
| 3,272,240 | 9/1966 | Roth | 198/472 X |
| 3,313,393 | 4/1967 | Solski et al. | 198/472 |
| 3,530,571 | 9/1970 | Perry | 198/349 |
| 3,648,819 | 3/1972 | Converse, III et al. | 198/346.1 |
| 3,934,700 | 1/1976 | Schubert et al. | 198/472 X |
| 4,013,165 | 3/1977 | Bush | 198/817 |
| 4,014,428 | 3/1977 | Ossbahr | 198/472 |
| 4,019,623 | 4/1977 | Tassi et al. | 198/457 |
| 4,040,533 | 8/1977 | De Boer et al. | 198/472 |
| 4,074,805 | 2/1978 | Bodewes | 198/790 |
| 4,230,219 | 10/1980 | Pezzin et al. | 198/346.2 |
| 4,515,264 | 5/1985 | Sticht | 198/465.2 X |
| 4,519,491 | 5/1985 | Prodel et al. | 198/349 |
| 4,646,245 | 2/1987 | Prodel et al. | 198/349 |

FOREIGN PATENT DOCUMENTS

| 0013733 | 6/1980 | European Pat. Off. . | |
| 1814452 | 8/1969 | Fed. Rep. of Germany . | |
| 2106595 | 10/1972 | Fed. Rep. of Germany . | |
| 2518689 | 11/1976 | Fed. Rep. of Germany | 198/465.2 |
| 2644136 | 4/1978 | Fed. Rep. of Germany | 198/472 |
| 2752268 | 6/1979 | Fed. Rep. of Germany . | |
| 3111706 | 1/1982 | Fed. Rep. of Germany | 198/346.1 |
| 1376066 | 9/1964 | France . | |
| 1549729 | 12/1968 | France . | |
| 2284379 | 4/1976 | France . | |
| 2306788 | 11/1976 | France . | |
| 2338200 | 8/1977 | France . | |
| 2369906 | 6/1978 | France . | |
| 2417238 | 9/1979 | France . | |
| 2491897 | 4/1982 | France . | |
| 2503679 | 10/1982 | France . | |
| 865417 | 4/1961 | United Kingdom . | |
| 2040244 | 8/1980 | United Kingdom . | |

OTHER PUBLICATIONS

"Elements Modulaires de Manutention Automatigue," *Machine-Outil.* No. 312, Oct. 1974.
"Montage Praxis–Bosch" Brochure.
"Flux du materiel avec. 1k Systems de Transport Sandt," Brochure.
"Techniques de Montage Et D'Assemblage," Warnecke, H. J. et al.
"Le Flexible Montage System de Bosch" Brochure.
"Bosch Flexible Assembly Systems" Brochure.
"The Bosch Assembly System" Brochure.
Soviet Work of N. H. Voronine et al., 1979, p. 161.
Soviet Authors Certificate No. 779,018.
Soviet work of V. A. Yakhimovitch, "Assembly-Line . . .", 1979, pp. 17–25.

*Primary Examiner*—Joseph E. Valenza
*Attorney, Agent, or Firm*—Pollock, Vande Sande & Priddy

[57] ABSTRACT

Apparatus for the assembly and/or machining of parts manually and/or automatically, comprising a multiplicity of work stations each having pallet transfer apparatus for the displacement of the part-carrying pallets to the interior of a station and from one station to another by one or more carriages in continuous movement in which the movement of a pallet by a carriage occurs along one edge.

5 Claims, 8 Drawing Sheets

APPARATUS FOR THE ASSEMBLY AND/OR MACHINING OF CIRCULATING AND IMMOBILIZABLE PARTS CARRIED BY PALLETS

This is a continuation of co-pending application Ser. No. 673,009 filed on Nov. 19, 1984, now abandoned, which is a continuation of Ser. No. 311,117, filed Oct. 14, 1981, and now U.S. Pat. No. 4,519,491, issued May 28, 1985.

The invention relates to an apparatus for the assembly and/or machining of parts.

For obtaining mechanical parts, particularly parts of small dimensions, one is forced, since several years, to break down the manufacture into a succession of operations which can each be performed rapidly and easily by the personnel or in an automatic fashion, and this with the aim of abundant production and at a low price.

Each of the operations is performed at a predetermined work post, some of the posts being operated manually and other posts being automatic, and the parts are transferred automatically from one post to another post.

The purpose of the invention is to furnish an apparatus of this type which operates under optimal conditions of safety for the personnel and of the regularity as to the manufacture, which is relatively inexpensive and thus finds a wide application.

Another aim of the invention is to allow for the adaptation of an installation having various fabrications and this with a minimum of transformations, thus making it possible to undergo variations in time due to customer demand.

Such installations, sometimes known as flexible shops, thus make it possible to manufacture parts economically, even if the total number of parts of a certain type to be produced is not considerable, the adaptation of the installation to the fabrication of a different part requiring only expenditures of an acceptable level.

The installation according to the invention is of the type which comprises means which move in a continuous manner to drive part supports or pallets, these means being utilized to move a pallet from one post to another post, and also to bring one or more selected pallets into positions in which the manual or automatic assembly and/or machining occurs.

It is directed particularly to an apparatus of the type in which the driving of a pallet occurs by means of an endless carriage in continuous displacement, and it is characterized by the fact that the cooperation of the carriage with the pallet occurs along an edge or margin of the pallet, such that a displacement of the pallet transverse to its longitudinal circulation movement is achieved without difficulties, thus making possible, either to bring the pallet into an operational position, from the point of view of the assembly or the machining of the part which it carries, or to bring it into a position of cooperation with a carriage cable adapted to drive it along a trajectory having a direction perpendicular to that of the preceding trajectory. It is thus through an edge perpendicular to the first edge that the driving of the pallet occurs.

Throughout the course of these longitudinal and/or transverse displacements, a pallet preserves the same direction in a horizontal plane.

The cooperation of the pallet with the carriage, for its drive, occurs preferably by means of the lower surface thereof, over a marginal zone.

To respond to the needs of automation of the operation of the apparatus, the pallet comprises on its lower surface of the coding elements whose position is provided to characterize the treatment to which the part carried by the pallet is to be subjected.

According to one characteristic of the invention, these elements are carried by two parallel supports, perpendicular to the margin provided for the longitudinal driving of the pallet and them also disposed along the margin. The space between the two supports is without obstacles, thus permitting for the transverse movement of the pallet to occur. On the other hand, the major portion of the lower surface of the pallet is thus free and can thus preferably serve for the support of an anvil. The pallet is thus perfectly adapted for the role of supporting a part which must be treated by a tool exerting on the part a vertical force, such as a drilling machine, a riveting machine, etc.

According to the invention, likewise, the lower surfaces of the two supports are provided for driving the pallet in the transverse movement by cooperation with a drive carriage.

The invention relates to an apparatus in which, at the intersection of two perpendicular passages, support blocks positioned at a fixed end contribute to the support and to the guidance of the pallet driven along one edge.

According to one embodiment, the support and guidance of the pallet on the blocks occur by means of hubs depending from the supports.

The invention provides that at least one hub of a pallet carries a sticker adapted to cooperate with detectors of fixed location on the end.

According to the invention, likewise, means are provided to make the pallet cooperate, at a predetermined location of its passage where are found a first passage and a second passage, perpendicular to the first, that the pallet can go along its downstream direction, either with a first cable of the carriage, or with a second cable of a carriage perpendicular to the first cable, the second carriage cable being rendered operational by its own rise which places it in contact with a drive surface of the pallet at a higher level than that which cooperates with the first cable.

A pallet can be driven in one direction or in a perpendicular direction, while nevertheless remaining in the same horizontal plan.

An apparatus adapted to several types of operation is composed of a multiplicity of mechanical assemblies or modules and the invention provides that the same frame is adapted to receive modules of different types for this adaptation.

According to one embodiment, the frame comprises cross beams and each of the modules has means allowing for it to be moved on the cross beams in the manner of a drawer and disengaged according to a reverse movement.

Preferably, the same cross beam serves for the assembly of adjacent modules, eliminating by the same the problem of the adjustment of height of the said modules imposed for the passage of the pallets from one module to an adjacent module.

The description which follows, given by way of example, refers to the annexed drawings, in which.

Figures 1, 2:
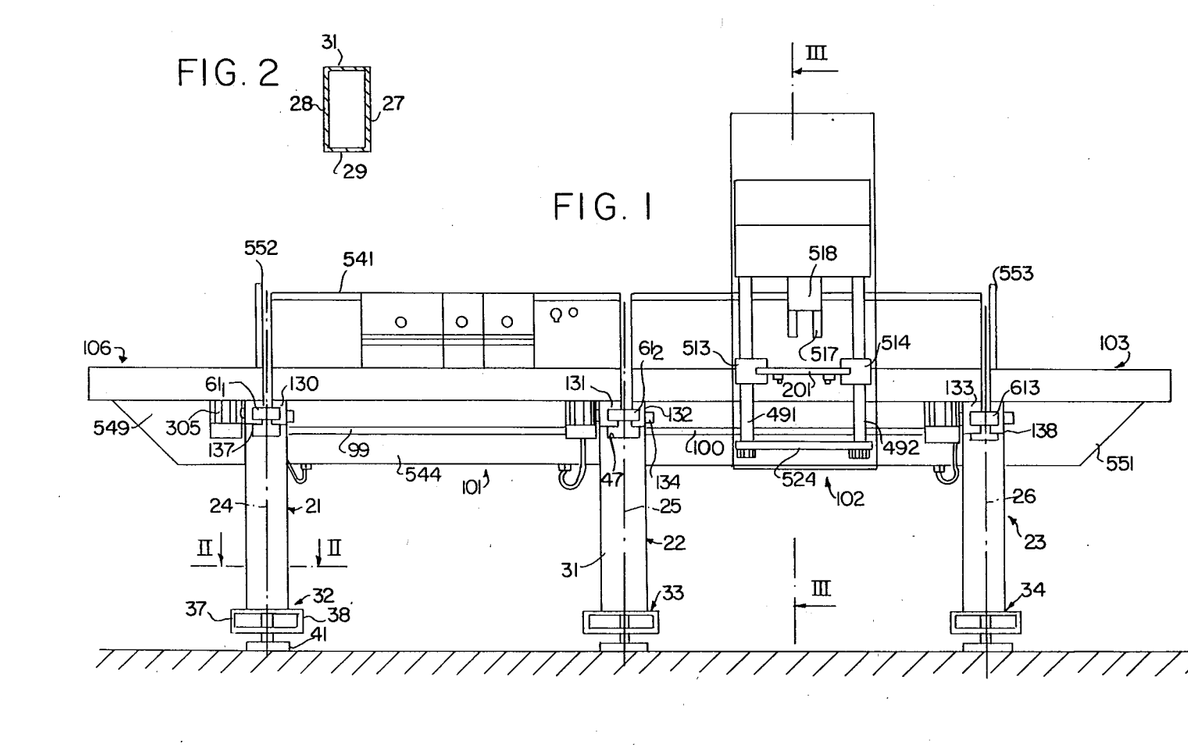
FIG. 1 is an elevational view of an apparatus according to the invention, for one embodiment.
FIG. 2 is a cross sectional view along line II—II of FIG. 1.

The flexible shop comprises, in the embodiment shown, a frame constituted by three feet, 21, 22, 23 (FIG. 1), of which the median vertical lines 24, 25, 26 are coplanar. Each foot is tubular and has, in transverse cross section, a rectangular configuration, thus having an anterior surface 27, a posterior surface 28 and two lateral surfaces 29, 31 (FIG. 2). Each foot is preferably obtained by the folding of an initially planar sheet of metal.

Each foot is erected on a base, respectively 32, 33, 34, tubular, having a rectangular transverse cross section, each having an upper surface 35 (FIG. 3), a lower surface 36 and lateral surfaces 37 and 38. The support on the ground, for each base, by means of two discs or end dampers 39, 41 integral with threaded shafts, respectively 42, 43, cooperating with a threading for horizontal adjustment.

The anterior wall 27 of a foot does not extend until the upper transverse edges 44, 45 (FIG. 4), thus providing an inlet 46 defined by a lower edge 47. Likewise, the posterior wall 28 of the foot does not extend until edges 44 and 45 but only until an intermediate edge 48, thus providing another inlet 49. The lateral walls 29 and 31 of a foot have two large grooves 51, 52 defined by edges 53, 54, 55, and 56, 57, 58 respectively, the edges 53 and 56 being coplanar, as well as edges 54 and 57 and edges 55 and 58, respectively.

In the space between the lateral walls 29 and 31, at the upper portion thereof, is lodged a cross beam 61 having a rectangular transverse cross section, the opposite surfaces 62 and 63 (FIG. 4) of the said cross beam facing respectively internal surfaces of the lateral walls 29 and 31. The attachment is obtained by bolts 64, 65 (FIG. 5), the bolt 64 extending through holes 66 and 67 of walls 29 and 31 as well as a hole 68 of the cross beam 61, the bolt 65 extending through holes 69 and 71 of walls 29 and 31 as well as a hole 72 of cross beam 61.

Figures 3, 5:
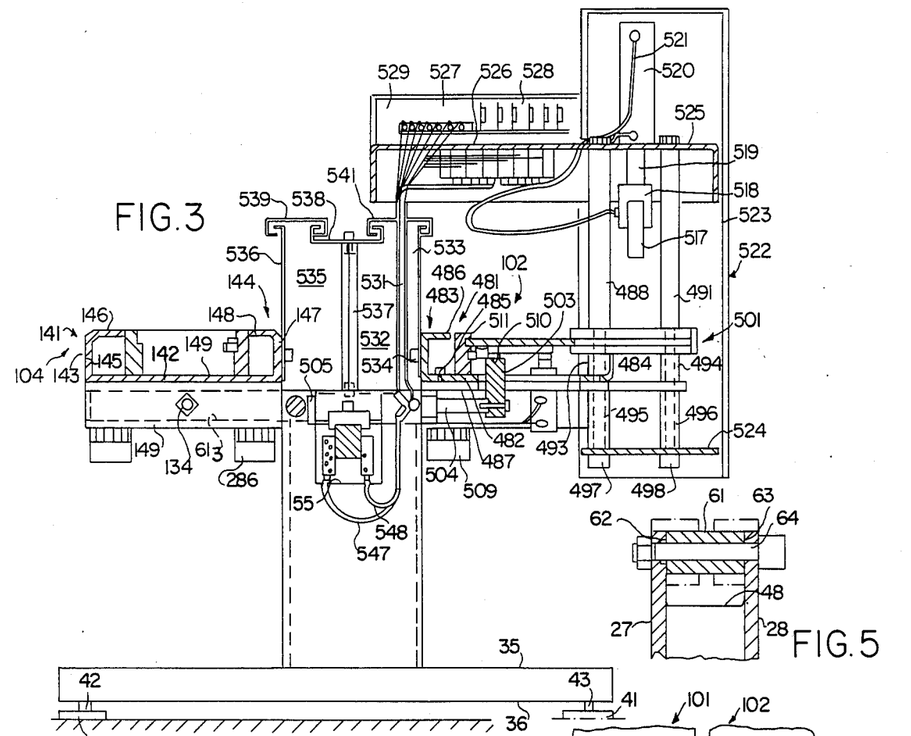
FIG. 3 is a vertical cross sectional view along line III—III of FIG. 1 or of FIG. 7, but on a larger scale.
FIG. 5 is a cross sectional view through a vertical longitudinal plane of the upper portion of a foot, to the right of an assembly means with a cross beam.

The lower surface 73 of cross beam 61 has a cutout 74 having an upper horizontal surface 75 and vertical surfaces 76 and 77. In the said cutout is lodged the upper median portion of a short longitudinal hat 81 having a "U" shaped transverse cross section having an anterior arm 82, a posterior arm 83 as well as a horizontal body 84, this latter being pierced towards each of its ends by its holes, respectively 85, 86 and 87, 88.

These holes serve as bolt passages, respectively 89, 91 and 92, 93 (FIG. 6) which serve for the attachment, by tapped holes 94, 95 and 96, 97 which they have, of main beams 98, 99 respectively.

The frame of the flexible shop thus comprises feet, at right angles of each foot cross beams of which each is directed towards the front and towards the rear from a median longitudinal plane 90, as well as reinforcement main beams.

The cross beams serve for the removable assembly of assemblies or modules which, in the embodiment shown, are in the number of six, i.e., a module 101 (FIG. 7) for manual assembly, a module 102 for assembly or automatic machining, a first angular return module 103, a first rapid rectilinear return module 104, a second rapid rectilinear return module 105 and a second angular return module 106.

Figure 7:
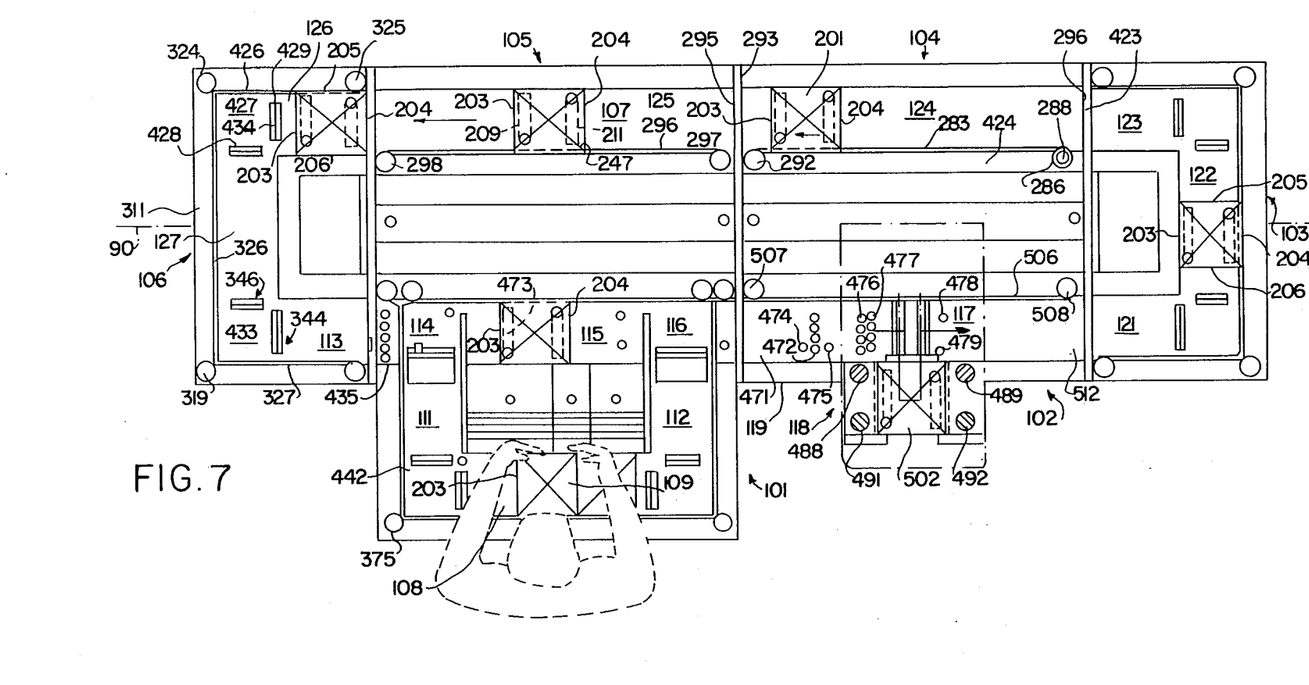
FIG. 7 is a planar view corresponding to Figure 1.
Figure 9:
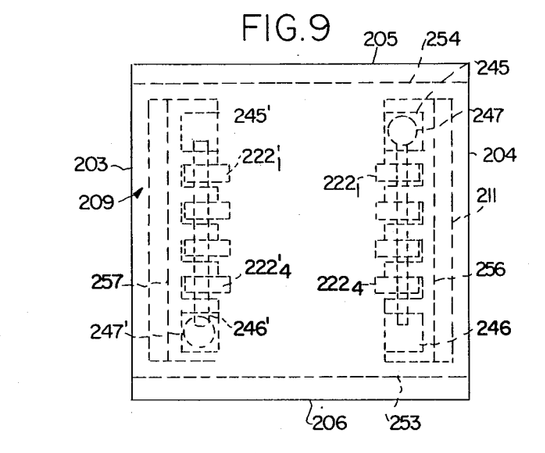
FIG. 9 is a planar view of a pallet along its upper surface.

The module 101 provides, for the part-carrying pallets (described in detail below), an anterior passage 108 in which the piece or pieces carried by a pallet, as shown at 109 can be assembled or otherwise treated manually (the operator, or female operator, is shown in chain lines). The passage 108 is fed with pallets from a passage 111 which is perpendicular to it, which provides the module 101 and the pallets, such as 109, located on the passage 108 can be evacuated by a passage 112 of the said module, perpendicular to the passage 108.

A pallet arrives at passage 111 of the module 101 from a passage 113, perpendicular to the passage 111, provided by the module 106. The end upstream of the passage 111 constitutes an intersection 114 which is within the extension of the passage 113.

Module 101 likewise provides a posterior passage 115 in alignment with passage 113 and whose downstream end forms, with the downstream end of the passage 112, an intersection 116.

The module 102, adjacent to the module 101, provides a passage 117 in the alignment of the passages 113 and 115, which has control over the entire length of the module 102, and at mid-length of the said passage the said module has an automatic assembly or machining post 118 projecting frontwardly with respect to the front surface 119 of the said module.

The module 103 has a passage 121, extending the passage 117 and in alignment therewith, and which is followed by a perpendicular passage 122, this one followed by a passage 123 perpendicular to the passage 122 and thus parallel to the passage 121.

The first rapid return module 104 has a passage 124 extending from the passage 123 and in alignment therewith, and thus parallel to the passages 113, 115 and 117.

The second rapid return module 105 provides a passage 125 extending the passage 124 and in alignment therewith, and the passage 125 is extended by a passage 126, in alignment with it, of the second angular return module 106, which likewise has a passage 127 perpendicular to the passage 126, passage 127 being followed by the passage 113 which is perpendicular to it.

Figures 6, 8, 14:
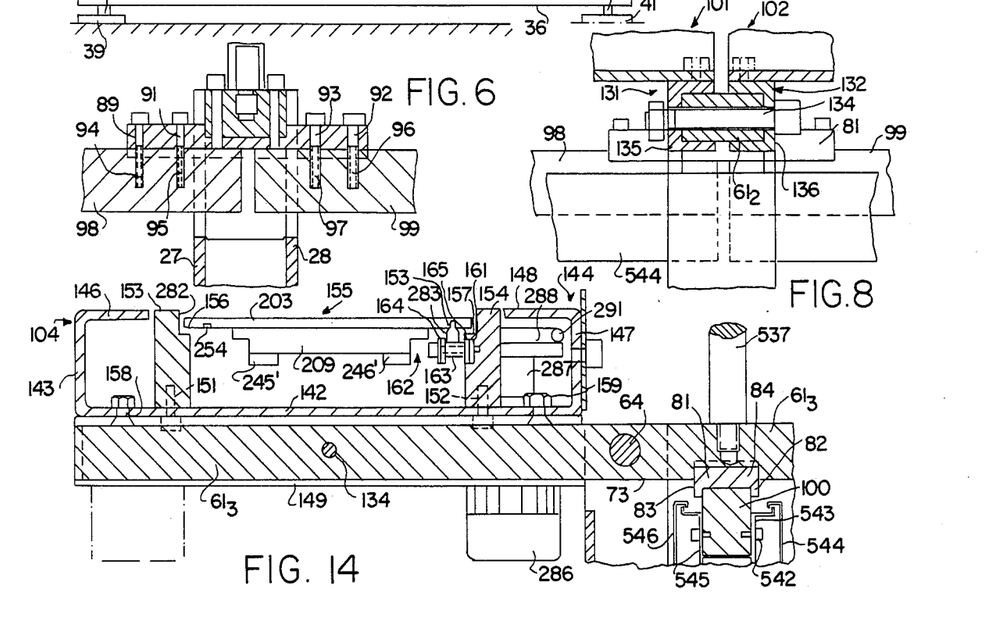
FIG. 6 is a vertical longitudinal cross sectional view illustrating the assembly of a foot, a cross beam and main beams.
FIG. 8 is a vertical longitudinal cross sectional view illustrating the assembly with a cross beam of two adjacent modules.
FIG. 14 is a view in vertical transverse cross section at the level of a rapid return module for the pallets.

Each of the modules is a mechanical unit which is assembled in the manner of a drawer on the frame. The module 101 is mounted by slides constituted by U irons, 130 and 131 (FIG. 1) which in forming the lateral ends at its lower portion, respectively on the cross beams $61_1$ and $61_2$ integral with the feet 21 and 22. Module 102 is mounted by slides constituted by irons having U cross sections, 132 and 133, on the the cross beams $61_2$ and $61_3$. On cross beam $61_2$, for example, is thus mounted, on its left hand portion, the module 101, while its right hand portion serves for the assembly of module 102. The integration of one and the other of the modules with a cross beam 61 is obtained by bolts 134 which go through both cross beam 61 as well as the bodies 135 and 136 of U irons 131 and 132 (FIG. 8).

The assembly and the attachment of the other modules occurs in an analogous manner.

A U iron forming a portion of module 106 and a U iron forming a portion of module 103 are shown in FIG. 1.

The modules are adapted to provide for the circulation of the pallets or part carriers, to assure their immobilization in predetermined positions, so as to allow for the treatment, manual or automatic, of the parts which they carry. The circulation of the pallets in controlled in a manual or automatic manner as a function of the treatment to be applied to the parts, for the feeding in parts, for the evacuation of parts, along preselected circumstances and under optimum safety conditions both with respect to personnel as well as the parts.

A pallet part carrier 201 (FIGS. 9-13) comprises a pallet body 202 constituted by a metallic plate, of rectangular configuration, having lateral surfaces 203, 204 and 205, 206, upper surface 207 and lower surface 208. By virtue of the fact that, as will be seen below, the orientation of the pallets remains identical, the surface 203 can be called the left surface, the surface 204 the right surface, the surface 205 the rear surface and the surface 206 the front surface, as seen from above.

Figure 10:
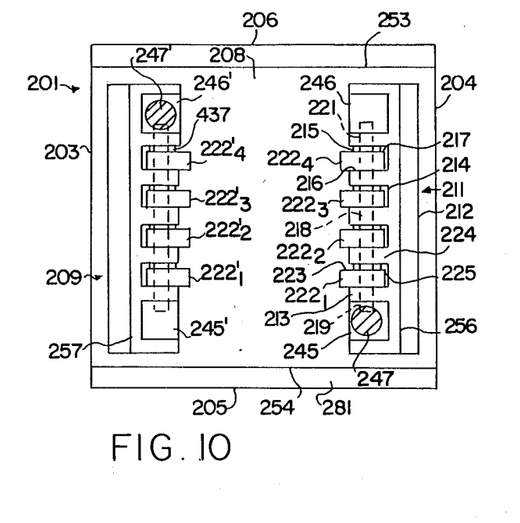
FIG. 10 is a planar view of a pallet along its lower surface.

On the lower surface 208 are attached two supports having a generally parallelpipedic configuration 209 and 211, in respective proximity of the front and rear surfaces 203 and 204. Each support, for example the support 211, has a planar external surface 212 (FIG. 10).

Its opposite internal surface 213 is notched, each notch 214, having a rectangular configuration, being defined by two parallel surfaces 215, 216 and an end 217. In the embodiment described, these notches number four for each support. They are traversed by an axis or shaft 218 attached at its ends in the ends 219 and 221 of the block and on which are rotationally mounted, positioned in each of the notches, contact pieces made of ferrous material 222 (FIGS. 12 and 13), likewise numbering four, $222_1$, $222_2$, $222_3$, $222_4$ for the support 211; $222'_1$, $222'_2$, $222'_3$, $222'_4$, for support 209. Between a planar surface of a contact piece and the facing surface 215 of an adjacent flap 224 defining the notch is interposed a joint, for example a toroid 225, made of rubber or the like, having a thickness which is initially greater than the spacing separating the cheek 223 of surface 215, the said joint thus introducing a friction in the rotation of the contact piece 222.

Figure 12:
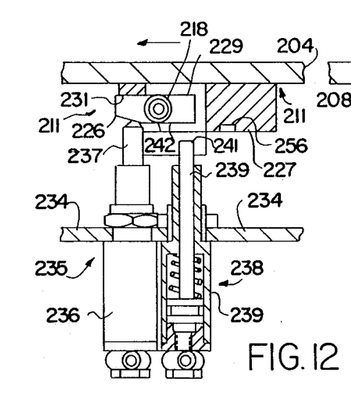
FIG. 12 is a vertical cross sectional view of a portion of a pallet and means for the coding.

Such a contact piece has a generally parallelpipedic configuration but has a bevelled surface 226, such that, in an inoperative position, as shown in FIG. 12, the said surface 226 remains beyond the plane extending from the surface 227 of the support 211 opposite to the surface 228 through which it is integral with the surface 208 of the plate 209 constituting the body of the pallet; the contact piece is thus supported by its surface 229, opposite to the surface 226, against a surface 231 of the support 211 (FIG. 12). In the other condition, operational, shown in FIG. 13, the said surface 226 of the said contact piece is in the said plane 227 and adapted to cooperate with a proximity detector 232 which the shaft 233 has fixed on an end or platform 234 of a module when the surface 226 is plum with shaft 233.

In FIG. 12, a small pneumatic jack 235 has further been shown, attached to the platform 234 whose body 236 is below the platform and the movable element 237 above the said platform and which, in the exit position, brings the contact piece 222 into the position where its surface 229 is in contact with the surface 231, i.e., in the inoperative position.

It has likewise been shown on this figure, attached to the platform 234, a second jack 238, whose body 239 is beneath the platform 234 and the movable element 239 above the said platform and which is adapted, by its end 241, to bring a contact piece 222 (situated in front of the contact piece shown in FIG. 12), into a position for which its surface 226 is coplanar with the surface 227 of the support 211, and this by cooperation with the surface 242 of the said contact piece.

At their ends, the supports 209 and 211 extend downwardly by means of hubs of parallelpipedic shape, 245, 246, for the support 211 and 245', 246', for the support 209. On the lower surfaces of the said supports one can glue, or otherwise attach, thin metallic stickers, as shown at 247, 247', particularly along a diagonal disposition.

The entire central portion of the lower surface 202 is free, that is to say without any obstacle or protrusion. The upper surface 207 of the plate is likewise free.

Nearer to its edges 205 and 206, the plate or plank 202 has on its lower surface 208 two narrow rectilinear projections 251 and 252 (FIG. 11) accommodating two threads 253, 254 made of a material having a friction coefficient greater than that constituting the plate 202, for example, of the rubber type, such as neoprene or the like, whose lower surface is coplanar with the lower surface 208.

The lower surface 227 of each support has a narrow groove 255 (FIGS. 12 and 13) for the lodging of threads 256 and 257 of neoprene or the like, flush with the said lower surfaces 227 and perpendicular to the threads 253, 254.

Alternatively, there are metal channels or a grinding which locally confer to the plate or to the blocks a higher coefficient of friction.

In certain cases, such a grinding is even useless.

Figure 11:
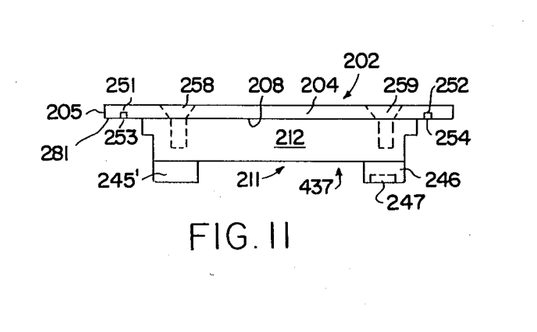
FIG. 11 is an elevational view of a pallet.

The attachment of the blocks 209, 211 to the plate 202 is achieved by screws, as shown at 258, 259 (FIG. 11).

Each of the modules comprises means for the guidance of the pallets, their placement in circulation by means of a single electric motor, means for the reception of the pallets from a preceding module and means for the transfer of the pallets to the following module.

The module 104, or first rapid return module, has (FIGS. 3 and 14) a module body 141 with a platform 142, a posterior or external edge 143 and an internal edge 144, the edge 143 having a vertical wall 145 and a return 146, while the edge 144 has a vertical wall 147 and a horizontal return 148. It is under the platform 142 which is attached the U iron 149 for the assembly and the attachment on the posterior portion of the cross beam 61$_3$.

At the end or platform 142 of the module 104 are attached, by screws 151 and 152 rails, respectively 153 and 154, of which the first, posterior or rear, is adapted to guide the pallets as shown at 155. The rail 153 has for this purpose a shoulder 156; the rail 154 also has a shoulder 157 at a level slightly lower than that of the shoulder 156. Screws 158, 159 contribute to the attachment of the U iron 149 to the platform 142 of the module 104. Rail 154 has a slot 161 for the attachment of a roller chain 162 of which each link has two rollers 163 framed by cheeks 164 and 165.

By means of its marginal portion 281, pallet 155 rests on shoulder 156 and is in contact at its rear surface 205 with the surface 282 of the rail 153. On its opposite edge, front, the pallet 155 rests by means of thread 253 against the carriage 283 having a circular cross section itself resting on rollers 163 of roller chain 162. The carriage 283 is driven by an electric motor 286 (FIG. 3) which equips the module 104 and which, through its shaft 287, drives a pulley 288 on which the carriage 283 passes which thus forms two cables, that is to say an operational cable 289 adjacent to the rail 154 and a return cable 291 which need not cooperate with a roller chain, the said carriage passing on a pulley 292 at the end 293 of the module 104 opposite to the end 294 carrying the electric motor 286. The resistance to the displacement of the carriage is relatively very low by virtue of its cooperation with the rollers 163.

The module 105, or second rapid return module, is constituted in an identical fashion to the module 104. The transfer of a pallet of the module 104 to the module 105 occurs without any difficulty, the pallet leaving the module 104 being driven at its inlet into the module 105, at the end 295 thereof, by virtue of a carriage 296 which equips the latter, driven by an electric motor which equips it, and guided by two pulleys 297, 298.

At the outlet of the passage 125 of the module 105, the pallet penetrates into passage 126 of the module 106 which extends the passage 125. This latter comprises means for driving the pallet along a perpendicular movement in the passage 127, then in the passage 113, in a movement perpendicular to that which it has in the passage 127.

FIGS. 15-18 show the portion of the module 106 at the connection of passages 127 and 113. Passage 127 is defined by two transverse rails 301 and 302 (FIG. 15) and the passage 113 by two longitudinal rails 303 and 304. An electric motor 305 (FIG. 17) forms a portion of module 106; it is placed under the lower wall of platform 306 of the said module, at the outlet of passage 113. The said module is further limited by an interior wall 307 extending into a horizontal edge 308, a lateral vertical wall 309 ending in a horizontal edge 311.

On shaft 312 of electric motor 305 is wedged, at its core, a pulley 314. This pulley has a bore 315 at its upper portion and a carriage 316 passes into this bore which has a circular transverse cross section. The cable 317 which leaves pulley 314 circulates in the direction of the arrow f$_1$ (FIG. 15) and arrives at the lower bore 318 of a pulley 319 having two bores. The bore 318 is at the level lower than that of the bore 315 of the motor pulley 314. The bore 318, close to the bottom or platform 306, thus defines a lower level; the second bore, 321, of the said pulley defines an intermediate level and the bore 315 defines an upper level. The pulley 319 is mounted for free rotation around an axis 322.

The cable 317, after having been passed on the pulley 319 in the lower bore 318, is followed by a cable 323 adjacent to the vertical wall 309 and which is at a lower level. After having passed on the lower bore of a pulley 324 (FIG. 7), provided for the connection between the passage 126 and the passage 127, then on a pulley 325 provided and the inlet of the passage 126, after having been again guided over the pulley 324, but over a bore thereof situated at an intermediate level, the carriage returns along a cable 326, which, after engagement in the bore 321, at an intermediate level of the pulley 319 continues by a cable 327 first rising then horizontal, which passes in the bore 315 of the pulley 314 at an upper level to connect itself to the cable 317.

One has thus, over a passage 127 of a horizontal cable 326 of the carriage, adjacent to the rail 301 and circulating in the direction of the arrow f$_2$, at an intermediate level and one has in the passage 113, adjacent to the internal surface 332 of the rail 304, a cable 327, circulating in the direction of the arrow f$_3$, at an upper level. The cable 327 rests on the rollers of the roller chain lodged in a skew notch of the said rail 304.

In the passage 127, a pallet rests by its support 209 on the cable 326 of the carriage, by means of its thread 257, which brings about its movement. The thread 326 rests in turn on the rollers 333 of a roller chain 334 positioned in the slot 335 of the rail 301.

The pallet is thus driven by the cable 326 and its movement is continued until the front thread 253 of the pallet, situated at a level above that of the thread 257, comes against the cable 327 of the carriage which circulates in a direction perpendicular to the displacement of the pallet and cooperates with the said cable to assure the movement of the pallet in a direction perpendicular to that of its anterior displacement, the movement of the pallet in the direction of the said anterior displacement being, if necessary, limited by abutment of its frontal surface 206 against the step 343 of the rail 304.

In the last portion of its displacement in the passage 127, the pallet is supported by cooperation of the lower surface of its hub 246 with a small rectangular block 344 attached on the floor or platform 306 and which has on its upper service a slot 345. At the end of the movement, the hub 246 escapes to the small block 344 (FIG. 15) and the hub 245 is not in a position of cooperation with the block 344, such that this small block 344 does not constitute an obstacle for the displacement of the pallet in the perpendicular direction. During this latter displacement, it is the hub 245' which cooperates with a second small block 346, having a generally perpendicular direction to that of the first small block 344, which contributes the support of the pallet.

During this latter movement, it is the vertical surface 347 of the small block 346 which assures a guidance of the pallet driven by the cable 327 of the carriage, while in the anterior displacement, perpendicular, it is the vertical surface 348 of the small block 344 which assured the guidance of the pallet driven by the cable 326.

Shortly thereafter, during the circulation of the pallet in the passage 113, the support thereof occurs by the rail 303 and 304, having skew notches.

The pallet is displaced in a single horizontal plane, in the passage 127, to the intersection 433, and likewise in the passage 113 perpendicular to the passage 127.

The attachment of the small blocks 344, 346, to the platform 306, occurs by means of a screw 300, in analogy with the attachment of the rails.

Figure 20:
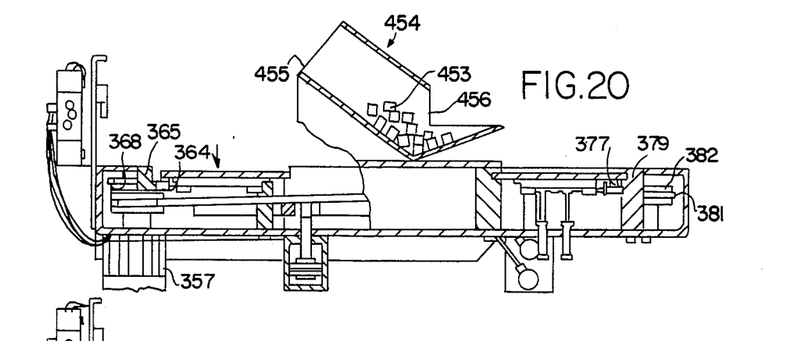
FIG. 20 is a cross sectional view along line XX—XX of FIG. 19.
Figure 21:
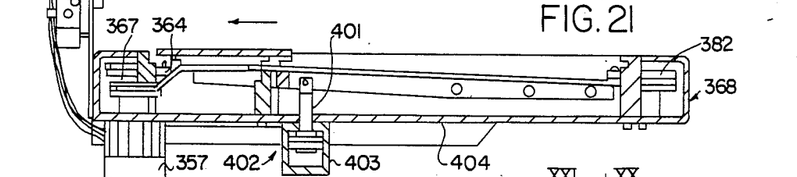
FIG. 21 is a cross sectional view along line XXI—XXI of FIG. 19.
Figure 22:
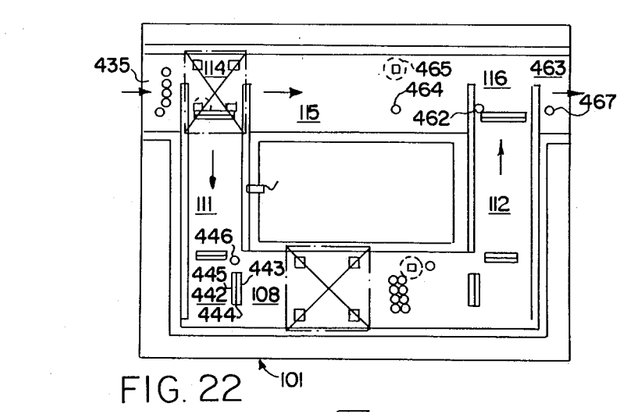
FIG. 22 is a schematic planar view of a manual assembly module.

To leave the module 106, the pallet reaches the module 101 whose drive means will now be described. On the shaft 356 (FIGS. 19-21) of an electric motor 357 is wedged a pulley 358 which is at the lower level and on which the rising cable 359 of a carriage passes which reaches a pulley 361 whose bore is at an upper level, the cable 359 having, in horizontal projection, a V configuration, having very open arms, by the intervention of a roller 362. After passage on the pulley 361, the carriage continues by a cable 363 to the upper level, which rests on the rollers of a roller chain 364 lodged in the slot of a rail 365 which border the passage 115 over its side spaced from the frontal anterior surface 366 of the module 101. The carriage then passes in the bore 368 of a pulley 367 positioned in the module 101 at the opposite end of that where the pulley 361 is positioned, at the same level as the bore of the pulley 361, that is to say at the upper level. From the pulley 367, the carriage continues along a descending cable 369, until a pulley 371, adjacent to the pulley 361, but whose bore 372 is at the lower level, the roller 362 avoiding the contact with the cable 359 in the median portion in the cables 359 and 369.

After passage over the pulley 371 the carriage continues by a transverse cable 373 which rests on an arm 374 and it continues on the bore of a pulley 375 positioned at an intermediate level, at the corner of the anterior edge 366 of the module 101 and its lateral left edge 376. Beginning with the pulley 375, the carriage reaches along a cable 377, the upper level by resting on the end roller of the roller chain positioned in the slot of a rail 379 adjacent to the vertical anterior wall 366 of the module 101. The cable 377 then passes on the bore 381, at the intermediate level, of a pulley 382, from where it continues at 90 degrees by a cable 383 resting on an arm 384 beginning at which the carriage returns to the lower level on the pulley 358 wedged on the shaft 356 of the electric motor.

The arm 384 is a flexible blade which is attached at its anterior end 391, by screws 392, on a block 393. Another arm 394, constituted by a flexible blade, is spaced from the arm 384 by a spacing equal to the width of a pallet. It is attached, at its anterior end 395, by screws 396 to a block or rail 397 serving for the guidance of the pallets in the passage 108. Between the arms 384 and 395 is interposed a swingle bar 398 and on the central fork 399 which the swingle bar has the mobile element 401 of a jack 402 ax whose body 403 is attached on the end or platform 404 of the module 101.

The arrangement equipping the passage 111 of the said module is analogous to that which has just been described and which equips the passage 112. It comprises, beyond the flexible blade 374 attached at its front end 405 by screws 406 to a block 407, spaced from the said blade by a distance equal to the width of a pallet, a second parallel blade 408, attached at its anterior end 409 by screws 411 to a block 412. Between the blades 374 and 408 is interposed a swingle bar 413 on which can act the movable element 414 of a jack 415.

The module of manual assembly 101 is followed by the automatic assembly and/or machining module 102, which will now be described.

Figure 23:
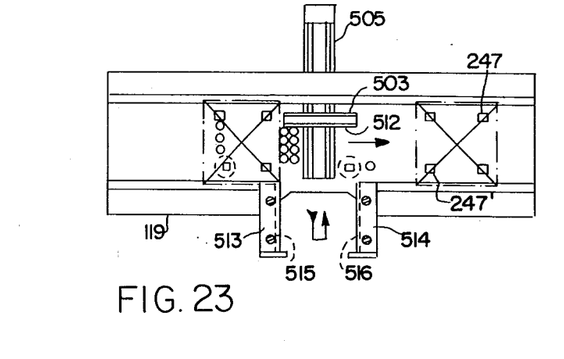
FIG. 23 is a planar schematic view of an assembly and/or automatic machining module.

The module 102 comprises a body 481 (FIG. 3) constituted by a platform 482, a posterior edge 483 and an anterior edge 484, the posterior edge having a vertical wall 485 and a return 486. From the floor 482 is integral a platen 487 which serves for the support of four columns 488, 489, 491, 492. The lower portions of the columns, of smaller diameter, are surrounded by tubular cross beams, as shown at 493, 494 and 495, 496. The assembly occurs by means of screws and bolts as shown at 497, 498. The columns traverse a window 501 in which can be engaged a part-carrying pallet as shown at 502, and this under the action of a push button 503, having cells 510, carried by the movable element 504 of a jack 505, the cell cooperating with the hubs 245, 245' of the pallet. The drive of the pallets to the interior of the module 102 occurs by a carriage 506 passing over pulleys 507, 508. The maintenance of the pallets in the passage 117 requires a rail 511 and their guidance by rails 551, 552 (FIG. 23).

The window 501 comprises transverse bars 513 and 514 projecting with respect to the frontal surface 119 and which provide grooves 515 and 516 for the guidance and the support of the pallet by its edges adjacent to the edges 202 and 204 (517) (FIG. 3) of the work station depend from a tool carrier 518 carried by the movable element 519 of a jack 520. An automatic apparatus 521 allows for the adjustment of the passage of the tool. As necessary, an anvil can be provided against which the lower surface 208 is supported, in its central portion left free, of the plate 202 forming a portion of the pallet.

The station 118 comprises a box 522 having vertical anterior wall 523, a lower plate 524 connected to the columns, as well as a plate 525, which extend towards the rear at 526 to define a compartment 527 comprising pneumatic elements 528 and electric elements 529. The conductors or conduits are assembled in bundles 531, which are contained in a longitudinal sheath 532 defined towards the front by a screen 533 attached on the posterior edge 483 by grooves 534. Another longitudinal sheet 535 is provided towards the rear and defined by a posterior screen 536 attached on the anterior edge 144 in module 104. These sheaths serve for the passage of pneumatic conduits and electric conductors.

From a cross beam, such as $61_3$, depends by screwing a small column 537 which allows, through a plate 538 having an edge which it supports, the assembly of the covers 539, 541.

On a main beam, as the main beam 100, are attached, by screws 542, container bodies for 543 having cover 544 on the front surface and 545, 546 on the rear surface. From these containers leave bundles of conduits or conductors 547, 548. Longitudinal covers are provided to contribute to the rigidity of the modules 106 and 103. Screens 552, 553 block the longitudinal sheaths at their ends.

One will now describe the movement of a part-carrying pallet in the apparatus, both with respect to the interior of the module as well as for the passage from one module to an adjacent module, while specifying the means provided to automatically control and verify the various circuits which the pallet can follow to compensate for particularly the more or less cumbersomeness of a work station.

In the passage 124 of the first rapid return module 104, a pallet, as shown at 201, circulates in the direction of the arrow $F_1$ or longitudinal direction under the driving action of the carriage 283, driven by the electric motor 286, on the shaft of which is wedged the pulley 288 which, in cooperation with the pulley 292, defines the closed circuit of the carriage 283. The electric motor 286 is positioned adjacent to the inlet 423 of the module 104 on the anterior edge 144 thereof.

At the outlet 293 of the passage 124, the pallet penetrates into the passage 125 of the module 105 through the inlet 295 thereof, adjacent to the outlet 293, and it is driven in the passage 125 by the carriage 296 positioned in alignment with the frame 283. The closed circuit of the frame 296 is assured by pulleys 297 and 298. The pulley 297 is wedged on the shaft of an electric motor 425 positioned in the proximity of the inlet 295 of the passage 125.

In the passage 124, the pallet is guided by the rail 153 (FIG. 14) and in the passage 125 it is guided by a rail which extends the rail 153. The movement of the pallet occurs without discontinuity, the velocities of the frames 283 and 296, which occur simultaneously on the pallet by passage of this latter from the passage 124 to the passage 125, being identical.

In the passage 127 (FIG. 7) of the module 106 extending the passage 125, the pallet is driven by the cable 426 of the carriage and, when it reaches the intersection 427 between the passage 126 and the passage 127, it is supported by cooperation of its lower hubs 246, 246′ with a small block 428 extending the internal rail of the passage 126, for the circulation in the extension of the said passage. In the passage 127, the pallet is driven in the transverse direction by the cable 326. At the beginning of its circulation in the passageway 127, for the support of the pallet a small block 429 contributes, having vertical guide surfaces 434, and which cooperate with the hubs 246 and 247 of the pallets. The pallet then reaches the intersection 433 between the passage 127 and the passage 113 where its change of direction of movement occurs as has been explained in detail with reference to FIGS. 15-18.

Figure 13:
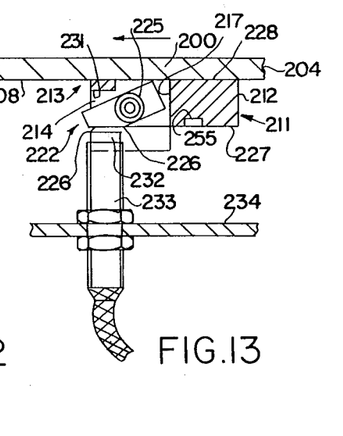
FIG. 13 is a vertical cross sectional view of a pallet portion, with a cooperating proximity detector.
Figures 15, 16, 17, 18:
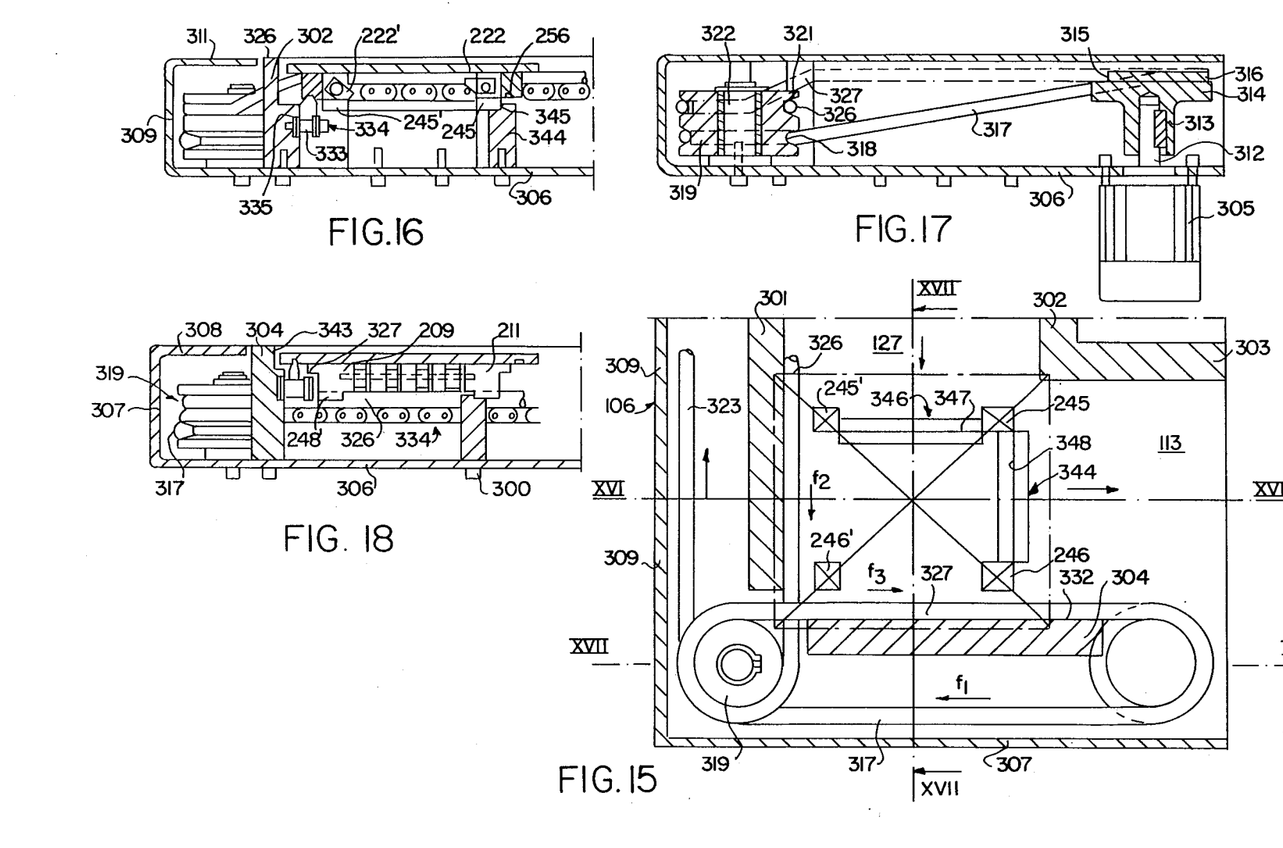
FIG. 15 is a horizontal cross sectional view of a portion of an angular return module.
FIG. 16 is a cross sectional view along line XVI—XVI of FIG. 15.
FIG. 17 is a cross sectional view along line XVII—XVII of FIG. 15.
FIG. 18 is a cross sectional view along line XVIII—XVIII of FIG. 15.

At the inlet 435 of the module 101, which extends the passage 113 of the module 106 which is immediately upstream of the intersection 114 between the passage 111 and the passage 115, are found a row of holes in certain of which one can introduce proximity detectors of the type shown in FIG. 13, the said holes having been shown respectively at $436_1$, $436_2$, $436_3$, $436_4$ (FIG. 19), the holes provided with a detector having been shown encased in the figure. These detectors are adapted to verify if the contact pieces of a row of the pallet which are presented are in a condition which correspond to the arrival of the said pallet towards the manual assembly location of the module 101 or whether they are in a condition which corresponds to the continuation of the movement of the pallet in the passage 115 of the said module extending the passage 113.

A detector 437 is adapted to cooperate with the sticker 247′ which comprises the hub 246′ of the pallet to cause the reading by the proximity detectors of the position of the contact pieces of the row upstream of the pallet. If the pallet need not be introduced into the module 101, it then continues its movement in the passage 115. If, on the other hand, the pallet must be introduced into the module 101, while the jack 438 provided at the end of the module 101, at the inlet of the passage 111, is activated, that is to say that its movable element 439 has left and constitutes an abutment for the pallet by cooperation with the hub 246′. The correct position thereof is verified by cooperation of a proximity detector 441 with the sticker 247 which comprise the hub 245.

The jack 415 is then activated, which raises the plates 374 and 408, by flexion around their ends 407 and 409. The said blades then raising the pallet by cooperation with the marginal zones of its lower surface adjacent to the supports and the pallet is driven in the passage 111 by cooperation of the cable 373 of the carriage with the thread 257 of the support 209. The movement continues until the arrival of the pallet to the intersection 442 between the passages 111 and the passage 108, a small block 443 contributing to the support and to the guidance of the pallet. A detector 446 is provided at the inlet of the intersection and, by cooperation with the sticker 247 of a pallet presented to the intersection, informs the intersection 114 that the access to the passage 108 of the module 101 is not free, which makes it possible to automatically forbid the introduction of a new pallet into the passage 111 and, on the contrary, makes it continue its movement in the passage 115.

Figure 19:
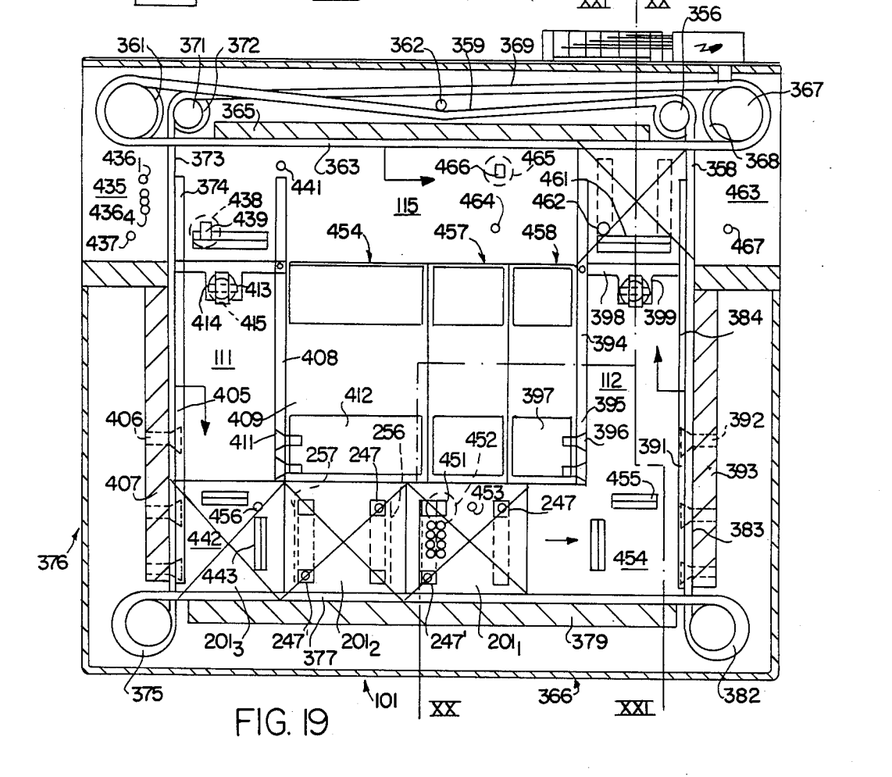
FIG. 19 is a horizontal cross sectional view of a manual assembly module.

In the condition shown in FIG. 19, a pallet $201_1$ is in its operational position, that is to say immediately facing the operator or female operator.

It is followed, on contact with it, by another pallet $201_2$, which is followed by a third pallet $201_3$, precisely to the intersection 442.

The operational position of the pallet $201_1$, is imposed by abutment of the hub 245′ of the said pallet against the end 451 then in projection, of a jack 452. It is the cooperation of the sticker 247 with a detector 453 which controls the output of the movable element 451.

In this position of the pallet 201, the female operator performs the required treatment, for example, by positioning parts 453 (FIG. 20) contained in an inclined passage 454 having inlet orifice 455 and outlet orifice 456. In the embodiment, three such passages have been provided, 454, 457, and 458 respectively.

In the treatment position of the part carried by the pallet, the contact parts of this latter are immediately plum with the mobile elements 237 and 239 of the jacks 235 and 238 (FIG. 12), the first being adapted to erase the contact parts 211, i.e., to render them inoperative with respect to the proximity detectors, the second, on the contrary, to render them operational by bringing them into the position shown in FIG. 13. One can thus prepare the pallet for its treatment of the part which it carries in the station placed downstream.

When the treatment of the part carried by the pallet $201_1$ is terminated, the female operator removes the abutment which constitutes the movable element 451 of the jack 452 and the pallet $201_1$ is driven by the cable 377 of the carriage. It arrives at the intersection 454 between the passage 108 and the passage 112, being supported at the end of its extent by the small block 455. When its edge 204 reaches the cable 383, it is this one which moves the pallet, and this one progresses in the passage 112 by being guided by the blades 384 and 394, this latter opposing a movement of the pallet transverse to the passage 112. When the pallet reaches the intersection 116 between the passage 112 and the passage 115, the cooperation of its sticker 247' with a detector 462 activates the jack 399 which, by means of the swingle bar 398, permits the blades 384 and 394 to descend, such that the pallet supported by these blades at its thread 254 which comes into contact with the cable 363 of the carriage; the driving of the pallet thus occurs towards the output outlet 463 of the module 101. In the first phase of the movement towards the outlet 463, the pallet is supported and guided by the small rectangular block 461.

The passage 115 towards the posterior edge of the pallet 101, comprises a proximity detector 464 which, by cooperation with a sticker 247' of the pallet, reveals the presence of a pallet in the passage 115 and makes it possible to defer, if necessary, the execution of the advancing order of a pallet beginning at its position of treatment of the part.

The passage 115 likewise comprises, on its platform, a jack 465 whose movable element 466 constitutes an abutment opposing the advancement of a pallet and thus forbidding the progression in the passage 115 as long as necessary to avoid a collision with a pallet leaving the passage 112.

A proximity detector 467 at the outlet 463 of the module 101 makes it possible to verify the complete passage of a pallet in the said outlet.

The pallets coming into module 102 are thus pallets whose pieces which they carry have been treated manually if they have followed the circuit of the passages 111, 108, 112, or not treated manually if they have followed the passage 115.

The module 102 has at its inlet 471 (FIG. 7) a row 472 of holes having proximity detectors adapted to cooperate with the row of contact parts of a pallet; a proximity detector 474 is adapted to cooperate with a sticker 247' of a pallet; the movable element of a jack 475 is provided for the stopping of a pallet upstream of the automatic post 117.

The module 102 likewise comprises two rows of jacks 476, 477 for the activation of the contact parts of a pallet. A proximity detector 478 is adapted to cooperate with a sticker 247 of the pallet and the movable element 279 of a jack allows for the immobilization of the pallet facing the treatment station.

At the outlet 512 of the module 102, a pallet penetrates into the module 103 through the passage 121 and the circulation in the said module occurs by means analogous to those which have been described for the module 106.

At the outlet of the module 103, through the passage 123, the pallets penetrate into the passage 124 of the first rapid return module 104.

One now refers to FIGS. 24–28.

Figure 24:
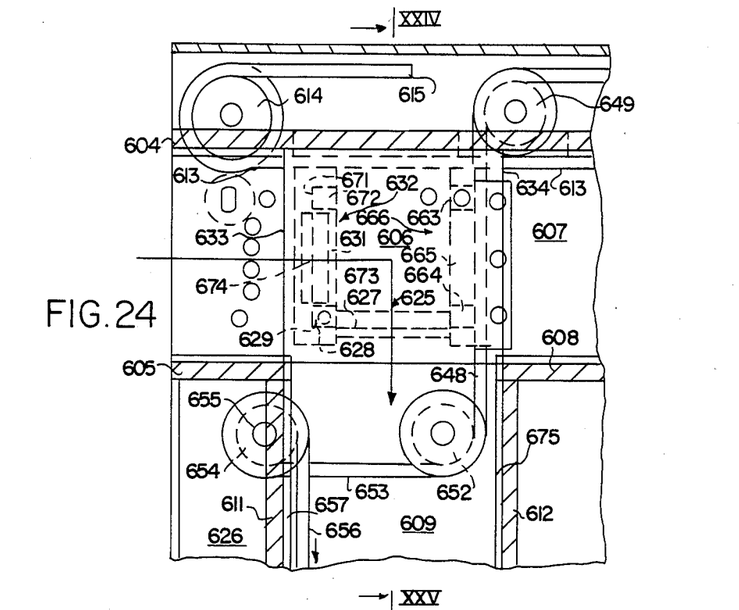
FIG. 24 is a horizontal cross sectional view of a portion of a transfer machine adjacent to an intersection of perpendicular passages.
Figure 25:
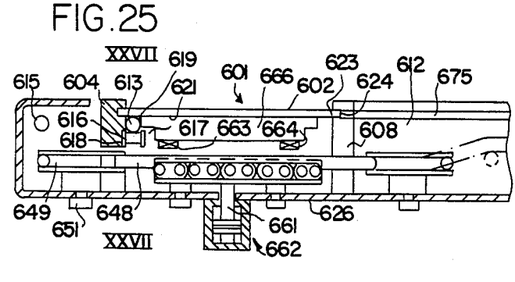
FIG. 25 is a cross sectional view along line XXV—XXV of FIG. 24.
Figure 26:
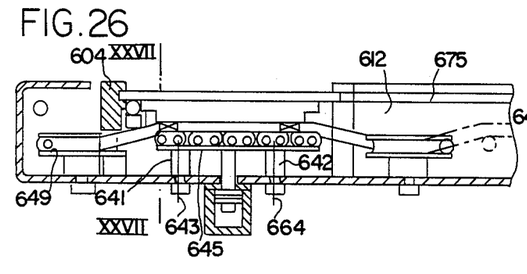
FIG. 26 is a view analogous to FIG. 25, for another condition.
Figure 27:
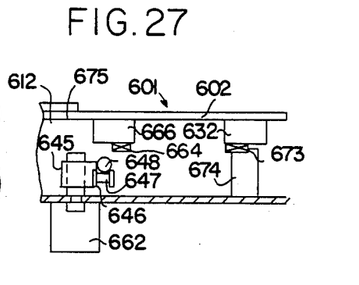
FIG. 27 is a view in cross section along line XXVII—XXVII of FIG. 25.
Figure 28:
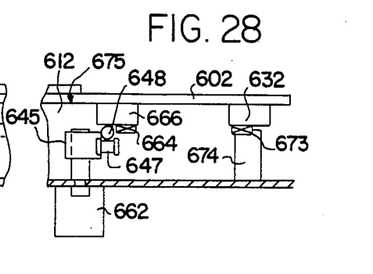
FIG. 28 is a cross sectional view along line XXVIII—XXVIII of FIG. 26.

Part supports or pallets 601 having a plate 602 of rectangular shape arrive by a passage 603, defined by a posterior rail 604 and an anterior rail 605, at an intersection 606 from where a first passage 607 begins extending the passage 603 and defined on the one hand by the posterior rail 604 and on the other hand by an anterior rail 608 and a second passage 608 defined by a left rail 611 and a right rail 612 perpendicular to the rails 604, 605, 608.

When it reaches the intersection 606, the pallet 601 is driven by a cable 613 of a carriage having a circular cross section, for example, made of polyurethane under mechanical tension driven by an electric motor not shown, and originating from a pulley 614 where the cable 615 of the carriage arrives.

The carriage 613 is supported and guided by the rollers 616 of a roller chain 617, attached, lodged in a skew notch 618 of the rail 604.

For driving the pallet 601, the carriage 613 cooperates with a marginal posterior zone 619 of the lower surface 621 of the plate 602.

When the pallet 601 must continue its movement in the extension of the passage 603, that is to say in the passage 607, its movement by the carriage 613 makes it reach the said passage 607 and it is the cable 613 which makes it progress into the said passage, its guidance being assured by cooperation of its anterior margins 623 with a groove 624 presented by the rail 608.

During its movement above the intersection 606, the guidance is assured by a block 625 attached on the end or platform 626 and which has a vertical surface 627 with which cooperates the vertical surface 628 of a hub 629 projecting with respect to the lower surface 631 of a support having rectangular configuration 632 whose general direction is parallel to the left and right edges 633 and 634 respectively of the plate 602.

At the inlet of the passage 607, on the platform 626, two small columns 641 and 642 are erected of which the plane of the axes 643 and 644 is transverse, that is to say, perpendicular to the passages 603 and 607 and along the length of the said small columns is mounted to slide a horizontal bar 645. The said bar, in a generally parallelpipedic shape, carries, on its surface 646, a section of chain rollers 647 and on the said rollers passes the cable 648 of a carriage having circular cross section, which can be or not that which comprises the cables 613 and 615, and beginning with a pulley 649 mounted to freely rotate at its axis 651 on the platform 626. The cable 648 continues until a pulley 652 from where the carriage continues by a cable 653 until a pulley 654 attached by its axis 655 to the right of the rail 611, the cable 656 leaving the pulley 644 adjacent to the internal surface 657 of the said rail and supported by the rollers of a roller chain, not shown, attached on the latter.

The bar 645 is supported at its median portion by the movable element 661 of a jack 662 attached on the platform 626, on the lower surface of the latter.

Figure 4:
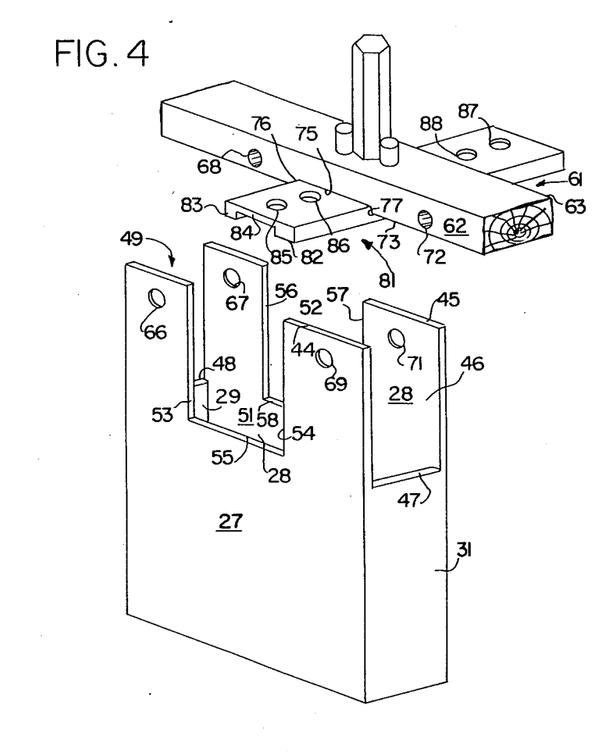
FIG. 4 is a partial perspective view of one portion of the frame, certain of the elements being spaced with respect to one another, for a better understanding.

The condition shown in FIGS. 2 and 4 is that for which the pallet arriving at the intersection 606 through the passage 603 continues its movement in the passage 607, extending the passage 603 under the driving action of the cable 613 as explained above.

If, on the other hand, the pallet arriving by the cable 603 must continue its movement in the passage 609, the jack 662 receives the fluid under pressure and the condition becomes that shown in FIGS. 3 and 5. At the end of its movement at the plum of the intersection 606, the hubs 663 and 664, which project with respect to the lower surface 665 of the right support 666 of the pallet 601, come into abutment against the cable of the carriage 648 and this is thus adapted to drive the pallet by cooperation with the lower surface 665 of the support, and this along the axis of the passage 609. During the first portion of the movement, the guidance of the pallet occurs by cooperation of the vertical surface 671 of the posterior hub 672 projecting downwardly with respect to the lower surface 631 of the support 632 with the vertical surface 673 which a block 674 attached to the floor 626 presents.

The movement occurs until the lower surface 631 of the support 632 comes to cooperate with the cable 656, the guidance occurring at the opposite edge of the pallet which cooperates with a groove 675 presented by the rails 612.

By the arrangement according to the invention, the movement of the pallet remains purely horizontal, that the pallet, upon leaving a passage arriving at an intersection, continues its movement into the extension of the said passage where, or, on the contrary, continues it along a perpendicular passage.

The fact of providing several carriages for driving the pallets in a module forming a portion of the transfer machines makes it possible to accommodate, in a single module, a large number of pallets, without each carriage necessarily being subjected to an excessive tension resulting from the resistances due to the friction of the carrige against the lower surfaces of the movable pallets.

We claim:

1. Plural interchangeable-module apparatus for moving individual pallets, each adapted for supporting a workpiece, over a defined path enabling a workpiece to pass one or more work stations, said apparatus comprising:
    (a) a plurality of substantially identical base units adapted to be secured to each other in juxtaposed end-to-end fashion, substantially all said base units having the same predetermined length in the direction of said end-to-end juxtaposition;
    (b) a plurality of pallet transport means each detachably connectable to any said base unit, the upper surface of each said pallet transport means having a guide means extending throughout its length and defining a generally rectilinear segment of said defined path, said guide means having a length substantially equal to said predetermined length of any said base unit, the combined height of any said base unit with a pallet transport means supported thereon being such as to cause the path segment of such pallet transport means to be situated substantially at waist level to optionally permit a person to conveniently perform a manual operation on a workpiece supported on a said pallet;
    (c) means for removably connecting each pallet transport means, in a direction of movement transverse to that of the rectilinear segment defined by the associated pallet transport means, to any said base unit, said connecting means including cooperating fastening elements on respectively each base unit and the associated pallet transport means for enabling alignment of said end-to-end juxtaposed plurality of pallet transport means to facilitate the smooth movement of any pallet over said defined path;
    (d) at least one said pallet transport means including auxiliary transport means for enabling transport of a pallet over a secondary transport path segment extending laterally from the rectilinear segment defined by such pallet transport means;
    (e) at least one pallet being connected to said plurality of pallet transport means for movement over said defined path; and
    (f) a work station associated with said at least one pallet transport means and adapted to cooperate with a pallet located on said secondary transport path;
    whereby any said pallet transport means may conveniently and quickly, by means of unskilled labor, be detached from a base unit on which it is supported and connected to any other base unit to thereby facilitate the rearrangement of pallet transport means of different kinds in said apparatus to accommodate said modular apparatus to the specific requirements of a particular operation without rearranging said base units, while still optionally also permitting the addition, deletion, and rearrangement of base units when expansion, contraction, or reconfiguration of the apparatus is desired.

2. The apparatus of claim 1 in which said plurality of end-to-end juxtaposed base units each support thereon a pair of said pallet transport means arranged parallel to each other to form thereby two parallel rows of pallet transport means for moving pallets in parallel opposite directions therealong, at least one of said pallet transport means effecting movement of a pallet over only a single main path segment and at least one other pallet transport means effecting movement not only over a single path segment but also over a secondary path segment, and a pair of end modules for enabling transport of pallets from one of said two rows of modules to the other.

3. The combination of claim 1 in which each said base unit comprises spaced vertical support members and at least one beam extending horizontally and substantially in the direction of said defined path and attached to said support member.

4. The combination of claim 3 which further includes spaced, parallel, horizontally disposed guide means extending transversely from said at least one beam, and each said pallet transport means includes spaced positioning means engageable with said guide means on a corresponding base unit whereby said pallet transport means is adapted to be removably secured in lateral engagement to a respective base unit.

5. The apparatus of claim 1, in which at least some of said base units support thereon two pallet transport means which are symmetrically disposed to either side of a vertical median plane extending in the direction of the length of the interconnected base units, said two pallet transport means defining two generally rectilinear parallel path segments for enabling transport of said pallets respectively in generally parallel but opposite directions on opposite sides of the median plane, said apparatus further including end units for enabling transport of pallets in a direction from one of the two parallel path segments to the other, said detachable connecting means for each of said base units further including two pairs of spaced, parallel, horizontally disposed guide means, one pair on each side of said median plane, and extending perpendicularly in opposite directions from said median plane, each pair of said guide means on one side of the median plane supporting a respective pallet transport means, said connecting means on said pallet transport means detachably engaging with said guide means on the respective base unit.

* * * * *